(12) United States Patent
Zhou et al.

(10) Patent No.: US 10,503,323 B2
(45) Date of Patent: Dec. 10, 2019

(54) METHOD AND APPARATUS OF TOUCH CONTROL FOR MULTI-POINT TOUCH TERMINAL

(71) Applicant: SHANGHAI DOUWU NETWORK TECHNOLOGY CO., LTD, Shanghai (CN)

(72) Inventors: TianWei Zhou, Shanghai (CN); ErXi Chen, Shanghai (CN)

(73) Assignee: SHANGHAI DOUWU NETWORK TECHNOLOGY CO., LTD., Shanghai (CN)

( * ) Notice: Subject to any disclaimer, the term of this patent is extended or adjusted under 35 U.S.C. 154(b) by 715 days.

(21) Appl. No.: 14/527,320

(22) Filed: Oct. 29, 2014

(65) Prior Publication Data

US 2015/0049058 A1 Feb. 19, 2015
US 2017/0205908 A9 Jul. 20, 2017

(30) Foreign Application Priority Data

Jul. 25, 2014 (CN) .......................... 2014 1 0357414

(51) Int. Cl.
  *G06F 3/044* (2006.01)
  *G06F 3/0488* (2013.01)
(52) U.S. Cl.
  CPC ............ *G06F 3/044* (2013.01); *G06F 3/0488* (2013.01); *G06F 2203/04104* (2013.01)
(58) Field of Classification Search
  CPC ................... G06F 3/0488; G06F 2203/04808
  USPC ...................... 345/173–178; 178/18.01–18.09
  See application file for complete search history.

(56) References Cited

U.S. PATENT DOCUMENTS

| | | | | |
|---|---|---|---|---|
| 6,524,186 | B2* | 2/2003 | Takatsuka | A63F 13/06 463/37 |
| 2003/0107607 | A1* | 6/2003 | Nguyen | G06F 3/04883 715/863 |
| 2008/0225014 | A1* | 9/2008 | Kim | G06F 3/04886 345/173 |
| 2010/0009733 | A1* | 1/2010 | Garvin | A63F 13/10 463/5 |
| 2010/0306650 | A1* | 12/2010 | Oh | G06F 3/0482 715/702 |
| 2011/0124376 | A1* | 5/2011 | Kim | G06F 1/1626 455/566 |
| 2011/0169760 | A1* | 7/2011 | Largillier | G06F 3/04883 345/173 |
| 2013/0249843 | A1* | 9/2013 | Yano | G06F 3/0488 345/173 |

(Continued)

OTHER PUBLICATIONS

Graham Mcallister ("A Guide to iOS Twin Stick Shooter Usability", Mar. 30, 2011, http://www.gamasutra.com/view/feature/134693/a_guide_to_ios_twin_stick_shooter.php).*

*Primary Examiner* — Stacy Khoo
(74) *Attorney, Agent, or Firm* — Muncy, Geissler, Olds & Lowe, P.C.

(57) ABSTRACT

A method and apparatus of touch control for a multi-point touch terminal, wherein the apparatus of the touch control obtains a first operation for a first touch button on a touch screen of the multi-point touch terminal by the user and a second operation for a second touch button thereof by the user, and then carries out an object operation corresponding to the second operation according to an operation object corresponding to the first operation.

20 Claims, 5 Drawing Sheets

(56) References Cited

U.S. PATENT DOCUMENTS

| | | | | |
|---|---|---|---|---|
| 2014/0165003 A1* | 6/2014 | Branton | ................ | G06F 3/0488 715/835 |
| 2014/0342829 A1* | 11/2014 | Togawa | .................. | A63F 13/06 463/37 |
| 2015/0369623 A1* | 12/2015 | Blumenberg | ........ | G01C 21/367 701/532 |

* cited by examiner

METHOD AND APPARATUS OF TOUCH CONTROL FOR MULTI-POINT TOUCH TERMINAL

This application claims priority to Chinese Patent Application Ser. No. 201410357414.X filed 25 July 2014.

TECHNICAL FIELD OF THE INVENTION

The invention relates to the computer field, particularly to a technique for touch control for a multi-point touch terminal.

TECHNICAL BACKGROUND OF THE INVENTION

At present, the operation of a touch screen is usually based on single-point touch control operation. Moreover, in the existing multi-point touch control technique, a plurality of the touch points for touch control operation also constitutes one operation, for example, slide unlocking operation of a mobile phone. Therefore, the complicate touch control operation cannot be carried out, thus causing poor interactivity and then influencing user experience.

SUMMARY OF THE INVENTION

The invention aims at providing a method and apparatus of touch control for a multi-point touch terminal.

According to one aspect of the invention, the invention provides the method of the touch control for the multi-point touch terminal, wherein the method comprises:
 a. obtaining a first operation for a first touch button on a touch screen of the multi-point touch terminal by the user and a second operation for a second touch button thereof by the user; and
 b. carrying out an object operation corresponding to the second operation according to an operation object corresponding to the first operation.

According to one aspect of the invention, the invention also provides the apparatus of the touch control for the multi-point touch terminal, wherein the apparatus comprises:
 a first device for obtaining the first operation of the first touch button on the touch screen of the multi-point touch terminal by the user and the second operation for the second touch button thereof by the user;
 a second device for carrying out an object operation corresponding to the second operation according to an operation object corresponding to the first operation.

Compared with the prior art, the invention obtains the first operation for the first touch button on the touch screen of the multi-point touch terminal by the user and the second operation for the second touch button thereof by the user, and then carries out the object operation corresponding to the second operation according to the operation object corresponding to the first operation. With two operation buttons on the multi-point touch screen, the invention supports more complicate human-computer interaction by the user, for example, the direction and movement of a character is selected by a button 1 and the operation which can be carried out by the character is selected and carried out by a button 2, thus improving the convenience and diversity of the operation of the multi-point touch screen, the efficiency of the human-computer interaction, as well as the user experience.

Moreover, the invention also detects whether the user touches an objective control area of the touch screen; if the user touches it, the first touch button or the second touch button is shown for the user to carry out the operation, thus improving the accuracy of interaction control, the convenience and diversity of the operation of the multi-point touch screen, the efficiency of the human-computer interaction, as well as the user experience.

Moreover, when the user stops touching the touched objective control area, the invention also can hide the first touch button or the second touch button; or the invention also can adapt the locations of the touch screens of the first touch button and the second touch button to various preset conditions, thus improving friendly interface, the efficiency of the human-computer interaction and the user experience.

Moreover, the first operation is also used for controlling the movement of the operation object. Furthermore, the second operation comprises adjusting the operation area of the object operation and carrying out various operations together with the first operation, thus realizing the support for the complicate human-computer interaction, as well as improving the convenience and diversity of the operation of the multi-point touch screen, the efficiency of the human-computer interaction, and the user experience.

Moreover, the invention also carries out the subsequent operation corresponding to the object operation after the object operation is completed, thus integrating more the entire operation, as well as improving the convenience and diversity of the operation of the multi-point touch screen, the efficiency of the human-computer interaction, as well as the user experience.

DRAWINGS OF THE INVENTION

Other characteristics, purposes and advantages of the invention shall appear more clearly when reading the following description, provided as a non-restricted example and in reference to the annexed drawings, wherein.

The same or similar reference signs in the figures refer to the same or the similar components.

EMBODIMENTS OF THE INVENTION

With the combination of the figures, the invention is further described in details as follows.

Figure 1:
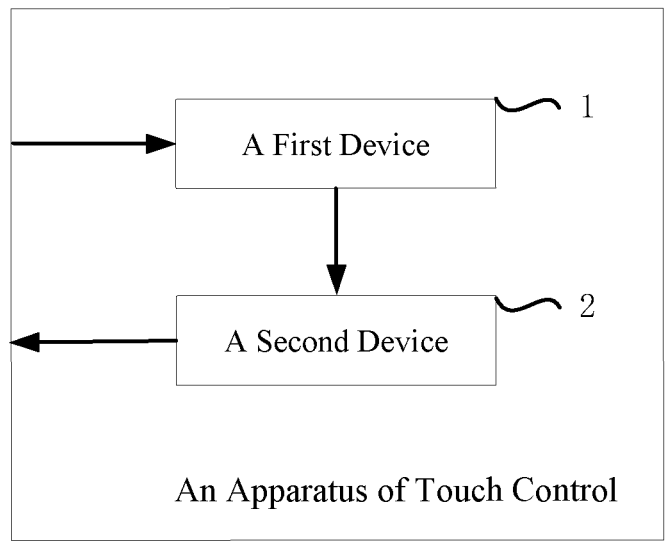
FIG. 1 shows a diagram of an apparatus of touch control for a multi-point touch terminal according to one aspect of the invention.

FIG. 1 shows a diagram of an apparatus of touch control for a multi-point touch terminal according to one aspect of the invention, wherein the apparatus of the touch control comprises a first device 1 and a second device 2. Specifically, the first device 1 is used for obtaining a first operation for a first touch button on a touch screen for the multi-point touch terminal by the user and a second operation for a second touch button thereof by the user; the second device 2 is used for carrying out an object operation corresponding to the second operation according to an operation object corresponding to the first operation.

Here, the apparatus of the touch control comprises but is not limited to a user apparatus, a network apparatus or the apparatus which the user apparatus and the network apparatus constitute through network integration. The user apparatus comprises but is not limited to any one of mobile electronic products which can carry out the human-computer interaction with the user through a touch plate, for example, a smartphone, PDA, etc. A mobile electronic product can adopt any operating system, for example, android, iOS, etc., wherein the network apparatus comprises an electronic apparatus which can automatically carry out numerical calculation and information processing according to preset or stored instruction. Its hardware comprises but is not limited to a microprocessor, an Application-Specific Integrated Circuit (ASIC), a Field Programmable Gate Array (FPGA), a Digital Signal Processor (DSP), an embedded apparatus, etc. The network apparatus comprises but is not limited to a cloud consisting of a computer, a network host, a single network server, multiple network server clusters or multiple servers. Here, the cloud consists of a large number of computers or network servers based on Cloud Computing, wherein the Cloud Computing is a distributing type calculation and a virtual supercomputer consisting of a group of loosely coupled computer clusters. The network comprises but is not limited to Internet, WAN (Wide Area Network), MAN (Metropolitan Area Network), LAN (Local Area Network), VPN (Virtual Private Network), wireless self-organizing network (Ad Hoc Network), etc. The person skilled in the art shall understand that other apparatus of the touch control is also applied to the invention, also within the protection scope of the invention and incorporated herein by reference.

The above devices are continuously operated. Here, the person skilled in the art shall understand that "continuously" means that the above devices obtain and carry out the first operation and the second operation according to a real-time working mode, a preset working mode or a real-time adjustment working mode, respectively, until the apparatus of the touch control stops obtaining the first operation for the first touch button on the touch screen of the multi-point touch terminal by the user and the second operation for the second touch button thereof by the user.

The first device 1 is used for obtaining the first operation for the first touch button on the touch screen for the multi-point touch terminal by the user and the second operation for the second touch button thereof by the user.

Specifically, the first device 1 obtains the operation on the touch screen by the user according to a touch detection component of the touch screen of the multi-point touch terminal, then matches the location of the operation with the location of the first touch button on the touch screen, and takes the operation conforming to the location of the first touch button as the first operation. Similarly, the first device 1 matches the location of the operation with the location of the second touch button on the touch screen and takes the operation conforming to the location of the second touch button as the second operation. The operation comprises but is not limited to click, double clicks, long press, post-press release, slide (including but not limited to all directions), rotation, etc.

Figure 5:
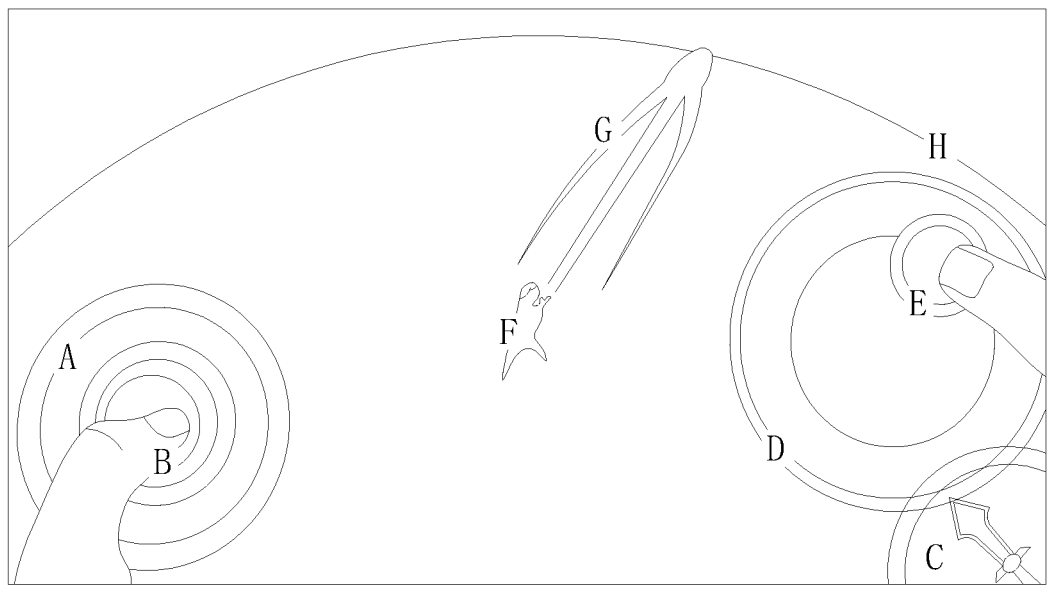
FIGS. 5-7 show a diagram of a touch screen for a multi-point touch terminal according to one preferred example of the invention.

FIG. 5 shows a diagram of a touch screen for a multi-point touch terminal according to one preferred example of the invention. As shown in FIG. 5, button B is the first touch button, and button E is the second touch button. When the user touches button B and button E, the first device 1 obtains the first operation for the first touch button on the touch screen of the multi-point touch terminal by the user and the second operation for the second touch button thereof by the user.

Here, the places, the graphs and other setting information of the first touch button and the second touch button can be determined based on default setting, the user, other adjustment setting, or the specific operation by the user. If the user carries out double clicks on one place of the touch screen, the place is determined as the center place of the second touch button. The scope range corresponding to the center place can be determined based on the default setting (for example, the preset radius scope) or other operations by the user. The person skilled in the art shall understand that the place comprises the center place and its corresponding scope range of the touch button.

Preferably, the locations of the first touch button on the touch screen and the second touch button on the touch screen correspond to at least one of the following items:

the dimension property of the touch screen, wherein the dimension property comprises but is not limited to vertical and horizontal lengths and vertical and horizontal proportions, for example, if the touch screen is relatively large, the corresponding scopes of the first touch button and the second touch button are also relative large; if the touch screen is relatively small, the corresponding scopes of the first touch button and the second touch button are also reduced equally proportionally; if the horizontal-to-vertical proportion of the touch screen is 4:3, the place and the size of the touch button are set according to the corresponding proportion; and if the horizontal-to-vertical proportion of the touch screen is 16:9 (widescreen), the place and the size of the touch button are set according to the design way corresponding to the widescreen;

the status property of the multi-point touch terminal held by the user, wherein the status property comprises but is not limited to the holding status (held by one hand, held by two hands, held horizontally and vertically, etc.) of the multi-point touch terminal, for example, when the user changes the terminal from vertical holding to horizontal holding, the distribution of the touch button shall be adapted to the horizontal and vertical adjustment of the screen;

the current application scenario information of the touch screen, wherein the current application shall comprises but is not limited to the application corresponding to the touch button or other applications, for example, according to the current page contents of the application corresponding to the touch button, the place of the touch button is adjusted, so as to avoid the impact on the display of the current page contents. Or, for example, if the couch screen has the other applications currently, the place and the application of the touch button shall be separated apart and distributed, so as to avoid the impact on the operation of other applications.

The second device 2 is used for carrying out the object operation corresponding to the second operation according to the operation object corresponding to the first operation.

Specifically, according to the first operation and based on the setting of the first touch button, the second device 2 determines the operation object corresponding to the first operation, for example, the object, within the place scope corresponding to the first touch button, is taken as the operation object. Or, according to the predefined bound setting, if the first touch button is touched, one predefined object bound by the first touch button is taken as the operation object. Here, if the predefined bound setting is adopted, the predefined objects can be positioned in any place of the touch screen but is not limited to be within the place scope corresponding to the first touch button.

With the example of FIG. 5, a physical object F is taken as the operation object. Then the second device 2 is according to the second operation, and the operation object carries out the object operation corresponding to the second operation. That is to say, the operation object carries out the contents corresponding to the second operation.

For example, if the second operation is "movement", the physical object F carries out the operation of "movement"; if the second operation is in "interaction with other objects", the physical object F carries out the operation of the "interaction".

Preferably, the first operation is at least partially overlapped with the second operation in timing sequence.

Specifically, the first operation and the second operation can be operated at the same time or during the preset threshold period. When the first operation is at least partially overlapped with the second operation in timing sequence, the operation can be the same with or different from one or more of the first operation, the second operation, the combination of the first operation and the second operation, etc, for example, if the second operation is to let the operation object corresponding to the first operation move within one preset scope, when the first operation is at least partially overlapped with the second operation in timing sequence, the corresponding operation is to let the operation object corresponding to the first operation move within the other preset scope.

Preferably, the first operation is used for controlling the movement of the operation object.

Specifically, beside that the first operation is used for determining the operation object, it also can move the operation object at any angle within the preset scope. Here, the preset scope comprises but is not limited to any scope within the touch screen or the scope corresponding to the first touch button.

For example, as shown in FIG. 5, the first operation firstly determines the operation object to be the physical object F and controls the physical object F to move within 360 degrees of the screen through the long-pressing, pulling and other operations.

Here, the person skilled in the art shall understand that the first operation and the second operation both can control the movement of the operation object. If the first operation is adopted to control the movement of the operation object, the second touch button and the second operation can be further released to make the second operation carry out more complicated function.

More preferably, the second operation comprises adjusting the operation area of the object operation. The second device 2 carries out the object operation based on the operation area of the current location of the operation object and according to the operation object.

Figure 6:
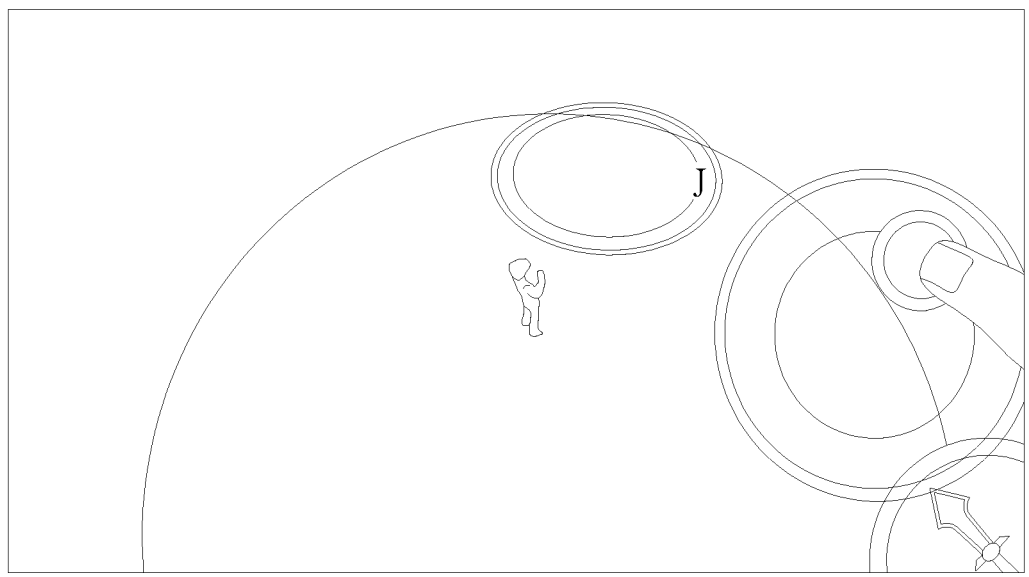
Figure 7:
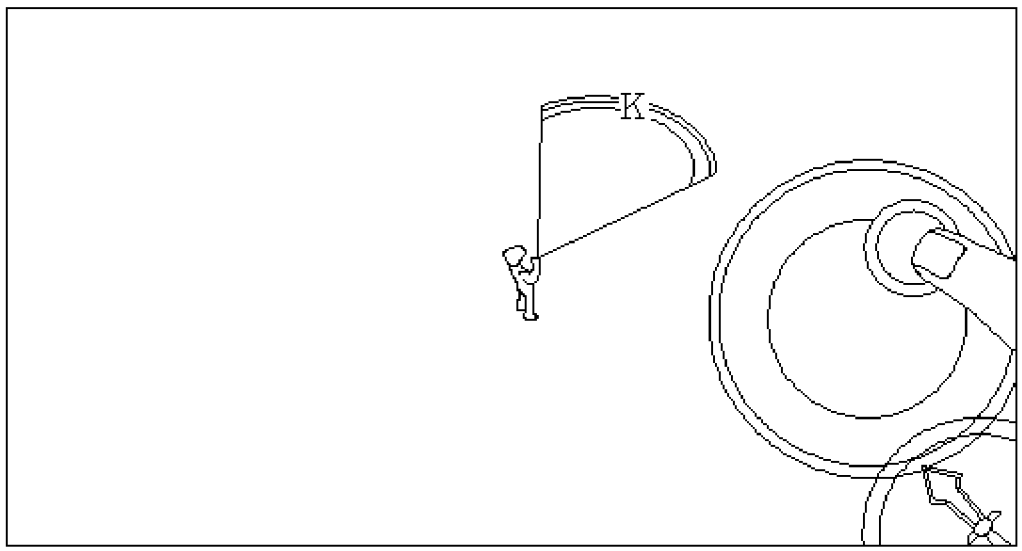

Specifically, the second operation also comprises adjusting the operation area of the object operation, for example, the operation area is set to be various areas with different sizes and shapes (for example, sector-shape, round-shape or other shapes). Here, for example, FIG. 5 shows the operation area with radius G. FIG. 6 shows the operation area with radius J. FIG. 7 shows the sector-shaped operation area with radius K.

The second device 2 determines the operation scope of the object operation based on the operation area and the current location of the operation object. And then, within the scope of the operation area, the object operation is carried out by the operation object, for example, if the operation area is a circle with radius r, and the operation object has the current place x, the operation area of the current place of the operation object is a circle with center x and radius r. If the operation object has the current place y, the operation area of the current place of the operation object is a circle with center y and radius r. If the object operation operates the operation object to carry out the interaction with other objects, and if the scope of the object operation is within the operation area, the corresponding operation is carried out; otherwise the corresponding operation shall not be carried out.

More preferably, the second device 2 can carry out the object operation based on an operation objective within the operation area of the current location and according to the operation object.

Specifically, the second device 2 can obtain the operation area of the current place and determine the operation objective corresponding to the operation area, for example, if the operation area is a circle with radius r, and if the operation object has the current place x, the operation area of the current place of the operation object is a circle with center x and radius r, and the second device 2 obtains all of the objects within the area as the operation objective. The second device 2, for the operation objective, carries out the object operation of the operation object, for example, if the operation object is a moving objective, the operation area is a circle taking the moving objective as its center. When the operation area moves to a car park, the operation objective is all of the cars in the car park. Then, the object operation is the related introduction information obtaining the operation objective, and hence the second device 2 obtains the introduction information of all of the cars.

Here, the person skilled in the art shall understand that the object operation also comprises different interaction information, i.e., the interaction between the operation object and the operation objective, for example, when the operation object is a game character and the operation objective is taken as the objective attack object, the interaction comprises but is not limited to dialogue, attack, pickup and other related operations.

More preferably, the second operation comprises adjusting the operation objective of the object operation.

Specifically, based on the preset operation logic, when the second operation conforms to one or more predefined operation logics for adjusting the operation objective of the object operation, the second operation is used for adjusting the operation objective of the object operation.

For example, after the operation objective of the object operation is determined based on the preset way or other ways, if the user carries out one or more predefined operation sequences, the operation objective of the object operation is adjusted based on the operation logic set by the sequence. If the user carries out the second operation of "clicking the blank area of the touch screen, pressing for a long time and sliding upwards", the operation objective of the object operation adjusted by the second operation is other objectives different from the original operation objective. Here, the person skilled in the art shall understand that the operation sequence is only exemplary but not limited to the invention. If other operation sequences can be adapted to the invention, they also can be used for adjusting the operation objective of the object operation.

More preferably, the apparatus of the touch control also comprises a fifth device 5', wherein the fifth device 5' is used for showing the adjusted operation area synchronously based on the current location of the operation object, during the adjustment for the operation area.

Specifically, the fifth device shows the adjusted operation area synchronously, based on the current place of the operation object, during the adjustment for the operation area, with the way that the scope boundary or a scope ring is shown in the screen. When the operation object is operated within the operation area, the operation is successful. Otherwise, if the operation object operates outside of the operation area, the fifth device, through showing colors, marks or other information, shows that the operation is not allowed.

Preferably, the apparatus of the touch control also comprises a sixth device 6', wherein the sixth device 6' carries out the subsequent operation corresponding to the object operation after the object operation is completed.

Specifically, after the object operation is completed, based on one or more conditions of the default setting, user selection and so on, and based on the completed object operation, the sixth device carries out the subsequent operation corresponding to the object operation, for example, if the completed object operation is to obtain the introduction of the objects, the subsequent operation is the interaction with the objects (for example, the dialogue). Preferably, the subsequent operation also can be set to be operated within the preset time threshold after the object operation is completed. If the user carries out selection, determination or other operations within the threshold, the subsequent operation is continuously operated. Otherwise, if the user does not carry out the selection, determination or other operations when the threshold is exceeded, the subsequent operation is stopped.

The person skilled in the art shall understand that the application scenario applied to the invention comprises but is not limited to:

1) an intelligent agent in the field of artificial intelligence, for example, a schedule secretary, a tourism secretary and so on based on the agent (proxy). The agent represents the corresponding user to carry out the corresponding operations, for example, the agent is moved to the specific area through the first touch button. The agent, through the second touch button, carries out the query and booking of a hotel as well as the interview and appointment with other users.
2) Geographic Information System (GIS) including navigation applications, for example, as to pedestrians, public transport passengers, motorists and other different user characters, the agent supports and operates their corresponding operations, for example, the agent is moved to the specific area through the first touch button. The agent, through the second touch button, carries out the path query, navigation, friend query, appointment, and so on.
3) Game designs or applications, for example, as to the existing operations based on the multi-point touch screen, the implementing direction of the actions of most of the operation objectives must conform to the orientation of the objectives. This causes the operation design of such objects to have limitation. By contrast, the invention can carry out the character design and the operation design of the user simultaneously, thus improving design efficiency, simplifying design complication and increasing design robustness.

Figure 2:
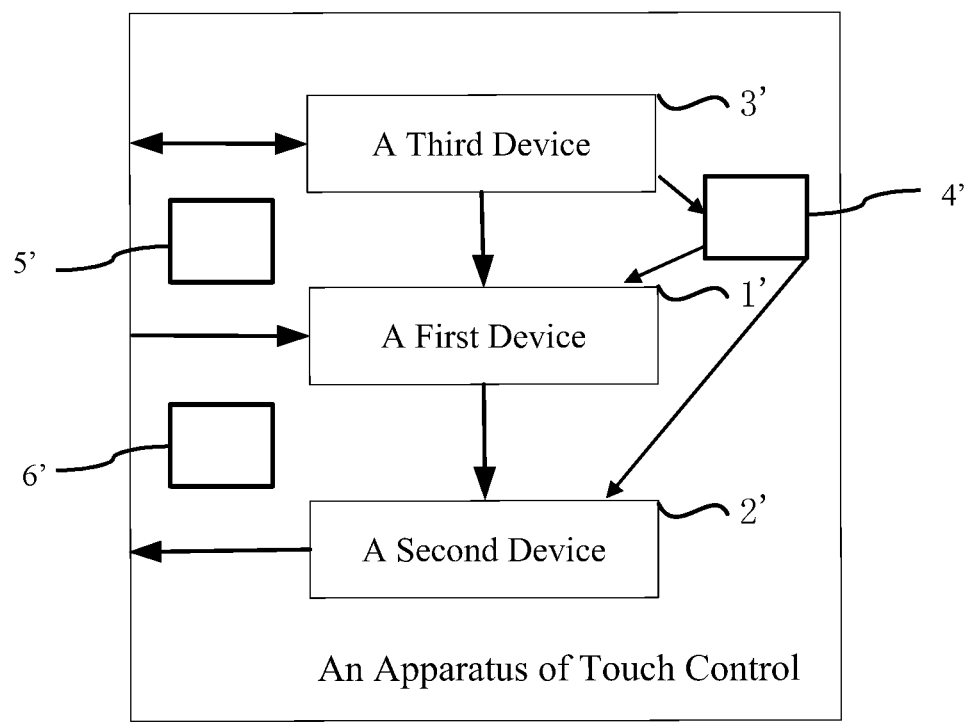
FIG. 2 shows a diagram of an apparatus of touch control for a multi-point touch terminal according to one preferred example of the invention.

FIG. 2 shows a diagram of an apparatus of touch control for a multi-point touch terminal according to one preferred example of the invention, wherein the apparatus of the touch control comprises the first device 1', the second device 2' and a third device 3'. Specifically, the third device 3' is used for detecting whether the user touches the objective control area of the touch screen. If the user touches it, the first touch button or the second touch button is shown for the user to carry out the operation. The first device 1' is used for obtaining the first operation for the first touch button on the touch screen for the multi-point touch terminal by the user and the second operation for the second touch button thereof by the user. The second device 2' is used for carrying out the object operation corresponding to the second operation according to the operation object corresponding to the first operation.

The first device 1' and the second device 2' are the same with or basically the same with the corresponding devices and incorporated herein with reference, which is not explained here any more.

The above devices are continuously operated. Here, the person skilled in the art shall understand that "continuously" means that the above devices detect whether the objective control area is touched as well as obtain and carry out the first operation and the second operation according to the real-time working mode, the preset working mode or the real-time adjustment working mode, until the apparatus of the touch control stops detecting whether the user touches the objective control area of the touch screen.

The third device 3' is used for detecting whether the user touches the objective control area of the touch screen. If the user touches it, the first touch button or the second touch button is shown for the user to carry out the operation.

Specifically, the third device 3' detects whether the user touches the objective control area of the touch screen according to the touch detection component of the touch screen of the multi-point touch terminal, Here, the objective control area can be a preset fixed area or the area which varies based on the current application scenario of the touch screen.

If the touch operation of the user matches the objective control area, the third device 3' shows the first touch button or the second touch button based on the matched area, for example, when the objective area corresponding to the first touch button is touched, the first touch button is shown, or both of the first touch button and the second touch button are shown at the same time, so as to be operated by the user. Here, the objective control area can be superposed with or cannot be superposed with the area corresponding to the first touch button and/or the second touch button.

Preferably, the multi-point touch terminal also comprises a fourth device 4', wherein when the user stops touching the objective control area of the touch screen, the fourth device 4' hides the first touch button or the second touch button.

Specifically, when the user stops touching the objective control area of the touch screen, that is to say, when the user stops touching the touch screen, or when the touch operation of the user does not match the objective control area, the fourth device hides the touch button corresponding to the objective control area, for example, if the third device has shown the first touch button and the second touch button, and if the user does not touch the objective control area corresponding to the first touch button any more, the fourth device hides the first touch button. Similarly, if the user does not touch the objective control area corresponding to the second touch button any more, the fourth device hides the second touch button.

Figure 3:
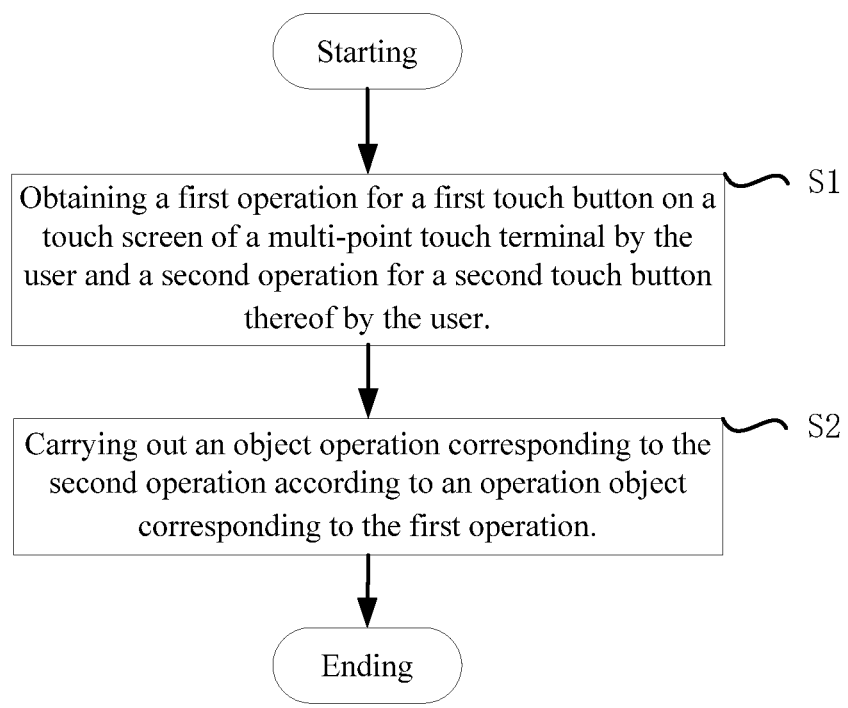
FIG. 3 shows a flow chart of touch control for a multi-point touch terminal according to one aspect of the invention.

FIG. 3 shows a flow chart of touch control for a multi-point touch terminal according to one aspect of the invention. Specifically, in Step S1, the apparatus of the touch control obtains the first operation for the first touch button on the touch screen for the multi-point touch terminal by the user and the second operation for the second touch button thereof by the user. In Step S2, the touch control device carries out the object operation corresponding to the second operation according to the operation object corresponding to the first operation.

The above devices are continuously operated. Here, the person skilled in the art shall understand that "continuously" means that the above steps obtain and carry out the first operation and the second operation according to the real-time working mode, the preset working mode or the real-time adjustment working mode, respectively, until the apparatus of the touch control stops obtaining the first operation for the first touch button on the touch screen of the multi-point touch terminal by the user and the second operation for the second touch button thereof by the user.

In Step S1, the apparatus of the touch control obtains the first operation for the first touch button on the touch screen for the multi-point touch terminal by the user and the second operation for the second touch button thereof by the user.

Specifically, in Step S1, the touch control device obtains the operation on the touch screen by the user according to the touch detection component of the touch screen of the multi-point touch terminal. Then, in Step S1, the apparatus of the touch control matches the location of the operation with the location of the first touch button on the touch screen and takes the operation conforming to the location of the first touch button as the first operation. Similarly, in Step S1, the apparatus of the touch control matches the location of the operation with the location of the second touch button on the touch screen and takes the operation conforming to the location of the second touch button as the second operation. The operation comprises but is not limited to click, double clicks, long press, post-press release, slide (including but not limited to all directions), etc.

FIG. 5 shows a diagram of a touch screen for a multi-point touch terminal according to one preferred example of the invention. As shown in FIG. 5, button B is the first touch button, and button E is the second touch button. When the user touches button B and button E, in Step S1, the apparatus of the touch control obtains the first operation for the first touch button on the touch screen of the multi-point touch terminal by the user and the second operation for the second touch button thereof by the user.

Here, the places, the graphs and other setting information of the first touch button and the second touch button can be determined based on default setting, the user, other adjustment setting, or the specific operation by the user. If the user carries out double clicks on some place of the touch screen, the place is determined as the center place of the second touch button. The scope range corresponding to the center place can be determined based on the default setting (for example, the preset radius scope) or other operations by the user. The person skilled in the art shall understand that the place comprises the center place and its corresponding scope range of the touch button.

Preferably, the locations of the first touch button on the touch screen and the second touch button on the touch screen correspond to at least one of the following items:
the dimension property of the touch screen, wherein the dimension property comprises but is not limited to vertical and horizontal lengths and vertical and horizontal proportions, for example, if the touch screen is relatively large, the corresponding scopes of the first touch button and the second touch button are also relative large, for example, if the touch screen are relatively small, the corresponding scopes of the first touch button and the second touch button are also reduced equally and proportionally; if the horizontal-to-vertical proportion of the touch screen is 4:3, the place and the size of the touch button are set according to the corresponding proportion; and if the horizontal-to-vertical proportion of the touch screen is 16:9 (widescreen), the place and the size of the touch button are set according to the design way corresponding to the widescreen;

the status property of the multi-point touch terminal held by the user, wherein the status property comprises but is not limited to the holding status (held by one hand, held by two hands, held horizontally and vertically, etc.) of the multi-point touch terminal, for example, when the user changes the terminal from vertical holding to horizontal holding, the distribution of the touch button shall be adapted to the horizontal and vertical adjustment of the screen;

the current application scenario information of the touch screen, wherein the current application shall comprises but is not limited to the application corresponding to the touch button or other applications, for example, according to the current page contents of the application corresponding to the touch button, the place of the touch button is adjusted, so as to avoid the impact on the display of the current page contents. Or, for example, if the couch screen has the other applications currently, the place and the application of the touch button shall be separated apart and distributed, so as to avoid the impact on the operation of other applications.

In Step S2, the apparatus of the touch control carries out the object operation corresponding to the second operation according to the operation object corresponding to the first operation.

Specifically, in Step S2, according to the first operation and based on the setting of the first touch button, the apparatus of the touch control determines the operation object corresponding to the first operation, for example, the object, within the place scope corresponding to the first touch button, is taken as the operation object. Or, according to the predefined bound setting, if the first touch button is touched, some predefined object bound by the first touch button is taken as the operation object. Here, if the predefined bound setting is adopted, the predefined objects can be positioned in any place of the touch screen but is not limited to be within the place scope corresponding to the first touch button.

With the example of FIG. 5, the physical object F is taken as the operation object. In Step S2, the apparatus of the touch control is according to the second operation, and the operation object carries out the object operation corresponding to the second operation. That is to say, the operation object carries out the contents corresponding to the second operation.

For example, if the second operation is "movement", the physical object F carries out the operation of "movement". If the second operation is in "interaction with other objects", the physical object F carries out the operation of the "interaction".

Preferably, the first operation is at least partially overlapped with the second operation in timing sequence.

Specifically, the first operation and the second operation can be operated at the same time or during the preset threshold period. When the first operation is at least partially overlapped with the second operation in timing sequence, the operation can be the same with or different from one or more of the first operation, the second operation, and the combination of the first operation and the second operation, for example, if the second operation is to let the operation object corresponding to the first operation move within one preset scope, when the first operation is at least partially overlapped with the second operation in timing sequence, the corresponding operation is to let the operation object corresponding to the first operation move within the other preset scope.

Preferably, the first operation is used for controlling the movement of the operation object.

Specifically, beside that the first operation is used for determining the operation object, it also can move the operation object at any angle within the preset scope. Here, the preset scope comprises but is not limited to any scope within the touch screen or the scope corresponding to the first touch button.

For example, as shown in FIG. 5, the first operation firstly determines the operation object to be the physical object F and controls the physical object F to move within 360 degrees of the screen through the long-pressing, pulling and other operations.

Here, the person skilled in the art shall understand that the first operation and the second operation both can control the movement of the operation object. If the first operation is adopted to control the movement of the operation object, the second touch button and the second operation can be further released to make the second operation carry out more complicated function.

More preferably, the second operation comprises adjusting the operation area of the object operation. In Step S2, the apparatus of the touch control carries out the object operation based on the operation area of the current location of the operation object and according to the operation object.

Specifically, the second operation also comprises adjusting the operation area of the object operation, for example, the operation area is set to be various areas with different sizes and shapes (for example, sector-shape, round-shape or other shapes). Here, for example, FIG. 5 shows the operation area with radius G. FIG. 6 shows the operation area with radius J. FIG. 7 shows the sector-shaped operation area with radius K.

Then, in Step S2, the apparatus of the touch control determines the operation scope of the object operation based on the operation area and the current location of the operation object. And then, within the scope of the operation area, the object operation is carried out by the operation object, for example, if the operation area is a circle with radius r, and the operation object has the current place x, the operation area of the current place of the operation object is a circle with center x and radius r. If the operation object has the current place y, the operation area of the current place of the operation object is a circle with center y and radius r. If the object operation operates the operation object to carry out the interaction with other objects, and if the scope of the object operation is within the operation area, the corresponding operation is carried out; otherwise the corresponding operation shall not be carried out.

More preferably, in Step S2, the apparatus of the touch control can carry out the object operation based on the operation objective within the operation area of the current location and according to the operation object.

Specifically, in Step S2, the apparatus of the touch control can obtain the operation area of the current place and determines the operation objective corresponding to the operation area, for example, if the operation area is a circle with radius r, and the operation object has the current place x, the operation area of the current place of the operation object is a circle with center x and radius r. In Step S2, the apparatus of the touch control obtains all of the objects within the area as the operation objectives.

Then, in Step S2, the apparatus of the touch control, for the operation objective, carries out the object operation of the operation object, for example, if the operation object is a moving objective, the operation area is a circle taking the moving objective as its center. When the operation area moves to a car park, the operation objective is all of the cars in the car park. Then, the object operation is the related introduction information obtaining the operation objective, and hence the apparatus of the touch control obtains the introduction information of all of the cars.

Here, the person skilled in the art shall understand that the object operation also comprises different interaction information, i.e., the interaction between the operation object and the operation objective, for example, when the operation object is a game character and the operation objective is taken as the objective attack object, the interaction comprises but is not limited to dialogue, attack, pickup and other related operations.

More preferably, the second operation comprises adjusting the operation objective of the object operation.

Specifically, based on the preset operation logic, when the second operation conforms to one or more predefined operation logics for adjusting the operation objective of the object operation, the second operation is used for adjusting the operation objective of the object operation.

For example, after the operation objective of the object operation is determined based on the preset way or other ways, if the user carries out one or more predefined operation sequences, the operation objective of the object operation is adjusted based on the operation logic set by the sequence. If the user carries out the second operation of "clicking the blank area of the touch screen, pressing for a long time and sliding upwards", the operation objective of the object operation adjusted by the second operation is other objectives different from the original operation objective. Here, the person skilled in the art shall understand that the operation sequence is only exemplary but not limited to the invention. If other operation sequences are applied to the invention, they also can be used for adjusting the operation objective of the object operation.

More preferably, the method also comprises Step S5 (not shown), wherein in Step S5, the apparatus of the touch control is used for showing the adjusted operation area synchronously based on the current location of the operation object, during the adjustment for the operation area.

Specifically, in Step S5, the apparatus of the touch control shows the adjusted operation area synchronously, based on the current place of the operation object, during the adjustment for the operation area, with the way that the scope boundary or a scope ring is shown in the screen. When the operation object is operated within the operation area, the operation is successful. Otherwise, if the operation object operates outside of the operation area, in Step S5, the apparatus of the touch control, through showing colors, marks or other information, shows that the operation is not allowed.

Preferably, the method also comprises Step S5 (not shown), wherein in Step 6, the apparatus of the touch control carries out the subsequent operation corresponding to the object operation after the object operation is completed.

Specifically, after the object operation is completed, in Step S6, based on one or more conditions of the default setting, user selection and so on, and based on the completed object operation, the apparatus of the touch control carries out the subsequent operation corresponding to the object operation, for example, if the completed object operation is to obtain the introduction of the objects, the subsequent operation is the interaction with the objects (for example, the dialogue). Preferably, the subsequent operation also can be set to be operated within the preset time threshold after the object operation is completed. If the user carries out selection, determination or other operations within the threshold, the subsequent operation is continuously operated. Otherwise, if the user does not carry out the selection, determination or other operations when the threshold is exceeded, the subsequent operation is stopped.

The person skilled in the art shall understand that application scenario applied to the invention comprises but is not limited to:

1) intelligent agents in the field of artificial intelligence, for example, a schedule secretary, a tourism secretary and so on based on the agents (proxy). The agent represents the corresponding user to carry out the corresponding operations, for example, the agent is moved to the specific area through the first touch button. The agent, through the second touch button, carries out hotel query, booking, interview and appointment with other users and so on.
2) Geographic Information System (GIS) including navigation applications, For example, as to pedestrians, public transport passengers, motorists and other different user characters, the agent supports and operates their corresponding operations, for example, the agent is moved to the specific area through the first touch button. The agent, through the second touch button, carries out the path query, navigation, friend query, appointment, and so on.
3) Game designs or applications, for example, as to the existing operations based on the multi-point touch screen, the implementing direction of the actions of most of the operation objectives must conform to the orientation of the objectives. This causes the operation design of such objects to have limitation. By contrast, the invention can carry out the character design and the operation design of the user simultaneously, thus improving design efficiency, simplifying design complication and increasing design robustness.

Figure 4:
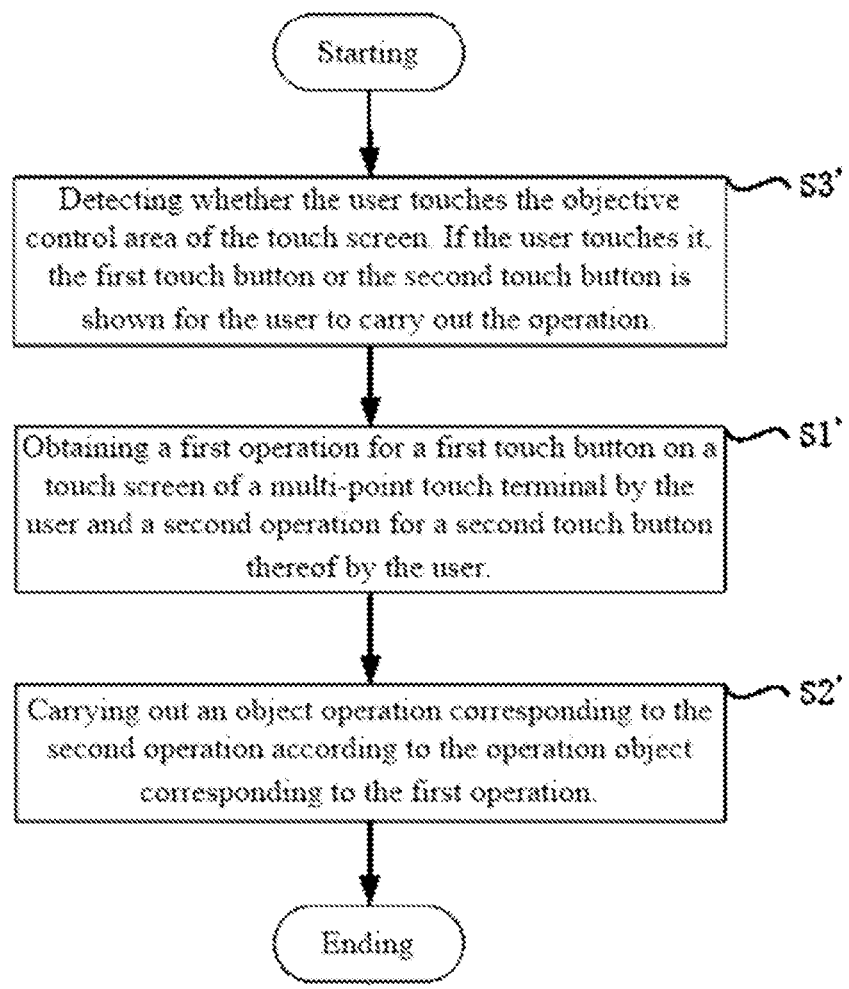
FIG. 4 shows a flow chart of touch control for a multi-point touch terminal according to one preferred example of the invention.

FIG. 4 shows a flow chart of touch control for a multi-point touch terminal according to one preferred example of the invention. Specifically, in Step S3', the apparatus of the touch control detects whether the user touches the objective control area of the touch screen. If the user touches it, the first touch button or the second touch button is shown for the user to carry out the operation. In Step S1', the apparatus of the touch control obtains the first operation for the first touch button on the touch screen for the multi-point touch terminal by the user and the second operation for the second touch button thereof by the user. In Step S2', the apparatus of the touch control carries out the object operation corresponding to the second operation according to the operation object corresponding to the first operation.

The Step S1' and Step S2' are the same with or basically the same with the corresponding steps and incorporated herein with reference, which is not explained here any more.

The above steps are continuously operated. Here, the person skilled in the art shall understand that "continuously" means that the above steps detect whether the objective control area is touched as well as obtain and carry out the first operation and the second operation according to the real-time working mode, the preset working mode or the real-time adjustment working mode, until the apparatus of the touch control stops detecting whether the user touches the objective control area of the touch screen.

In Step S3', the apparatus of the touch control detects whether the user touches the objective control area of the touch screen. If the user touches it, the first touch button or the second touch button is shown for the user to carry out the operation.

Specifically, in Step S3', the apparatus of the touch control, based on the touch detection component of the touch screen of the multi-point touch terminal, detects whether the user touches the objective control area of the touch screen. Here, the objective control area can be a preset fixed area or the area which varies based on the current application scenario of the touch screen.

If the touch operation of the user matches the objective control area, in Step S3', the apparatus of the touch control shows the first touch button or the second touch button based on the matched area, for example, when the objective area corresponding to the first touch button is touched, the first touch button is shown, or both of the first touch button and the second touch button are shown at the same time, so as to be operated by the user. Here, the objective control area can be superposed with or cannot be superposed with the area corresponding to the first touch button and/or the second touch button.

Preferably, the method also comprises Step S4' (not shown), wherein when the user stops touching the objective control area of the touch screen, in Step S4', the apparatus of the touch screen hides the first touch button or the second touch button.

Specifically, when the user stops touching the objective control area of the touch screen, that is to say, when the user stops touching the touch screen, or when the touch operation of the user does not match the objective control area, in Step S4', the apparatus of the touch control hides the touch button corresponding to the objective control area, for example, in Step S3', if the apparatus of the touch control has shown the first touch button and the second touch button, and if the user does not touch the objective control area corresponding to the first touch button any more, in Step S4', the apparatus of the touch control hides the first touch button. Similarly, if the user does not touch the objective control area corresponding to the second touch button any more, the apparatus of the touch control hides the second touch button.

For the person skilled in the art, the invention is obviously not limited to the details of the above-mentioned exemplary embodiments and can be realized with other concrete forms, without departing from the spirit or the basic features of the invention. Therefore, anyway, the embodiments shall be exemplary but not limited. The scope of the invention is defined by claims instead of the above-mentioned description, so as to incorporate in the invention the modifications falling within the meanings and the scope of equivalent elements of claims. Any reference sign in claims shall not be considered to limit the related claims. Furthermore, the term of "comprise" does not exclude other units or steps, and singular number does not exclude complex number. A plurality of units or devices in the claims of the device also can be realized by one unit or device through software or hardware. The terms of a first and a second are used for representing names instead of representing any specified order.

What is claimed is:

1. A method of touch control for a multi-point touch terminal, wherein the method comprises:

obtaining a first operation for a first touch button on a touch screen of the multi-point touch terminal by a user and a second operation for a second touch button thereof by the user;

carrying out an object operation corresponding to the second operation according to an operation object displayed on the touch screen corresponding to the first operation, wherein the second operation comprises moving an operation area of the object operation in relation to a current location of the operation object, showing the operation area based on the current location of the operation object when moving the operation area, and determining an operation objective corresponding to the operation area;

wherein the object operation is carried out if the operation objective is located within the operation area with a predetermined scope.

2. A method according to claim 1, wherein the first operation further comprises controlling a movement of the operation object.

3. A method according to claim 2, wherein the second operation further comprises adjusting a shape of the operation area of the object operation.

4. A method according to claim 1, wherein the second operation comprises adjusting the operation objective of the object operation within the operation area.

5. A method according to claim 1, wherein the first operation is at least partially overlapped with the second operation in timing sequence.

6. A method according to claim 5, further comprises:
carrying out a subsequent operation corresponding to the object operation after the object operation is completed.

7. A method according to claim 6, wherein locations of the first touch button on the touch screen and the second touch button on the touch screen correspond to at least one of the following items:
dimension property of the touch screen;
status property of the multi-point touch terminal held by the user; and
current application scenario information of the touch screen.

8. A method according to claim 1, further comprising when the user stops touching the objective control area of the touch screen associated with the first touch button, the first touch button is hidden, wherein the first touch button and the second touch button are simultaneously displayed if the user touches the first portion and the second portion of the objective control area.

9. A method according to claim 8, further comprising when the user stops touching the objective control area of the touch screen associated with the second touch button, the second touch button is hidden.

10. A method according to claim 1, wherein obtaining the first operation for the first touch button on the touch screen and the second operation for the second touch button on the touch screen comprises:
obtaining an operation on the touch screen by the user;
matching a location of the operation with the location of the first touch button; and
setting the operation as the first operation when the location of the operation conforms to the location of the first touch button.

11. A method according to claim 10, wherein obtaining the first operation for the first touch button on the touch screen and the second operation for the second touch button on the touch screen further comprises:

obtaining another operation on the touch screen by the user;
matching a location of the another operation with the location of the second touch button; and
setting the another operation as the second operation when the location of the another operation conforms to the location of the second touch button.

12. A method according to claim 1, wherein the operation object is controlled by the first operation and the second operation and is displayed independently of the first touch button and the second touch button.

13. A method according to claim 1, further comprising detecting whether the user touches a first portion of an objective control area of the touch screen and a second portion of an objective control area of the touch screen;
if the user touches the first portion of the objective control area, the first touch button is shown for the user to carry out the first operation; and if the user touches the second portion of the objective control area, the second touch button is shown for the user to carry out the second operation, wherein display and operation of the first touch button is provided independently of the display and operation of the second touch button; and
wherein if the user stops touching the first portion of the objective control area or the second portion of the objective area, one of the first touch button or the second touch button is hidden and another of the first touch button or the second touch button remains shown.

14. A method of touch control for a multi-point touch terminal, wherein the method comprises:
step a: obtaining a first operation for a first touch button on a touch screen of the multipoint touch terminal by a user and obtaining a second operation for a second touch button of the touch screen by the user, wherein the first operation comprises controlling a movement of an operation object, the second operation comprises moving an operation area of an object operation and determining an operation objective of the object operation within the operation area after adjusting the operation area of the object operation, and the first operation is at least partially overlapped with the second operation in timing sequence;
step b: carrying out the object operation corresponding to the second operation according to the operation object corresponding to the first operation, wherein step b comprises:
carrying out the object operation based on the operation area of a current location of the operation object and according to the operation object; and
carrying out the object operation based on the operation objective within the operation area of the current location and according to the operation object;
detecting whether the user touches a first portion an objective control area of the touch screen and a second portion of the objective control area of the touch screen;
if the user touches the first portion of the objective control area, the first touch button is shown for the user to carry out the first operation; and if the user touches the second portion of the objective control area, the second touch button is shown for the user to carry out the second operation, wherein display and operation of the first touch button is provided independently of the display and operation of the second touch button;
when the user stops touching the first portion of the objective control area or the second portion of the objective control area of the touch screen, one of the first touch button or the second touch button is hidden, and another of the first touch button or the second touch button remains shown;

showing the adjusted operation area synchronously based on the current location of the operation object, during the adjustment for the operation area; and carrying out a subsequent operation corresponding to the object operation after the object operation is completed, wherein locations of the first touch button on the touch screen and the second touch button on the touch screen correspond to at least one of the following items:

dimension property of the touch screen;

status property of the multi-point touch terminal held by the user; and current application scenario information of the touch screen.

15. A method according to claim 14, wherein controlling the movement of the operation object comprises moving the operation object at any angle within a preset scope.

16. A method according to claim 15, wherein controlling the movement of the operation object comprises moving the operation object 360 degrees within the touch screen.

17. A method of touch control for a multi-point touch terminal, wherein the method comprises:

obtaining a first operation for a first touch button on a touch screen of the multi-point touch terminal by a user and a second operation for a second touch button thereof by the user, wherein obtaining the first operation for the first touch button on the touch screen and the second operation for the second touch button on the touch screen comprises adjusting a location of the first touch button and a location of the second touch button in response to changing of application scenario information on the touch screen;

carrying out an object operation corresponding to the second operation according to an operation object displayed on the touch screen corresponding to the first operation; wherein the second operation comprises moving an operation area of the object operation in relation to a current location of the operation object, showing the operation area based on the current location of the operation object when moving the operation area, and determining an operation objective corresponding to the operation area; wherein the object operation is carried out if the operation objective is located within the operation area with a predetermined scope;

detecting whether the user touches a first portion of an objective control area of the touch screen and a second portion of an objective control area of the touch screen;

if the user touches the first portion of the objective control area, the first touch button is shown for the user to carry out the first operation; and if the user touches the second portion of the objective control area the second touch button is shown for the user to carry out the second operation, wherein display and operation of the first touch button is provided independently of the display and operation of the second touch button; and wherein if the user stops touching the first portion of the objective control area or the second portion of the objective area, one of the first touch button or the second touch button is hidden and another of the first touch button or the second touch button remains shown.

18. A method according to claim 17, wherein the first operation comprises controlling the operation object to move at any angle within a preset range.

19. A method according to claim 18, wherein controlling the movement of the operation object comprises moving the operation object 360 degrees within the touch screen.

20. A method according to claim 17, wherein the second operation comprises adjusting an operation area of the object operation to change a size or a shape of the operation area.

\* \* \* \* \*